May 15, 1962 L. A. YOUNG ET AL 3,034,358
BALE SAMPLING APPARATUS
Filed Feb. 20, 1959 2 Sheets-Sheet 1

LAWRENCE A. YOUNG
NOLAN C. COCHRON
INVENTORS
HUEBNER & WORREL
ATTORNEYS

BY *Richard M. Worrel*

LAWRENCE A. YOUNG
NOLAN C. COCHRON
INVENTORS

HUEBNER & WORREL
ATTORNEYS

BY Richard M. Ward

United States Patent Office 3,034,358
Patented May 15, 1962

3,034,358
BALE SAMPLING APPARATUS
Lawrence A. Young, Fresno, Calif., and Nolan C. Cochron, 8316 W. Ashlan, Fresno, Calif., assignors of two-thirds to H. A. Scott, Fresno, Calif., and one-third to said Cochron
Filed Feb. 20, 1959, Ser. No. 794,718
10 Claims. (Cl. 73—421)

The present invention relates to an apparatus for sampling baled material and more particularly to an integrated mobile unit adapted for movement longitudinally of a row of bales of compressed bulk material, such as cotton, and for stopping adjacent to the bales in such a row to remove portions of the bales for sampling or other purposes.

As is well-known, cotton after ginning is compressed into bales for convenience of handling, storage and delivery to market. Normally, at the cotton gins, the staple cotton is preliminarily compressed in low density bales which are thereafter marketed or transported to a compress for compression into high density bales and subsequent marketing. At the gin, the compress, or other site of storage, these bales are usually arranged in rows in a holding yard. While in the yard, samples are ordinarily taken from opposite sides of each bale for determining the grade and staple of the cotton.

It has been the practice in the past for workmen to use knives for cutting samples out of the bales. Because of the large number of bales to be sampled in any lot, it has been necessary to employ highly skilled labor for this task so as to obtain samples from all of the bales as quickly as possible. This prior art method of bale sampling is tedious, time consuming and wasteful. Even with skilled labor, excessive amounts of cotton are frequently removed from the bales. Any excess quantities removed constitute a waste which becomes serious in view of the vast number of bales sampled. Furthermore, it is becoming increasingly more difficult to obtain the right type of skilled labor for this purpose.

Since each bale may be sampled on as many as three different occasions, the described problems may be encountered several times while the cotton is in baled form.

With the foregoing in mind, it is an object of the present invention to provide an apparatus for quickly and efficiently removing samples from bales of compressed bulk material.

Another object is to minimize the labor and cost of bale sampling.

Another object is to enable the sampling of a bale to be performed by unskilled labor.

Another object is to minimize the waste of material in the sampling of bales of such material by facilitating more accurate sample selection.

Another object is to provide an apparatus which makes practical the use of a circular saw as a tool for removing a sample from a bale of compressed bulk material.

Another object is to provide a bale sampling apparatus which enables the sampling task to be performed with equal facility at night as during the day.

Another object is to provide an integrated mobile unit for use in processing baled cotton located in outdoor yards which provides a source of electrical power for energizing lights, tools, and the like at positions remote from usual plant electrical power supplies.

Other objects are to provide an apparatus for the nature described which is adjustable for sampling bales of various sizes, which is safe to employ even around highly combustible material such as cotton, which is dependable in action, and which is durable in construction.

These, together with other objects, will become more fully apparent upon reference to the following description and accompanying drawings.

Figure 1:
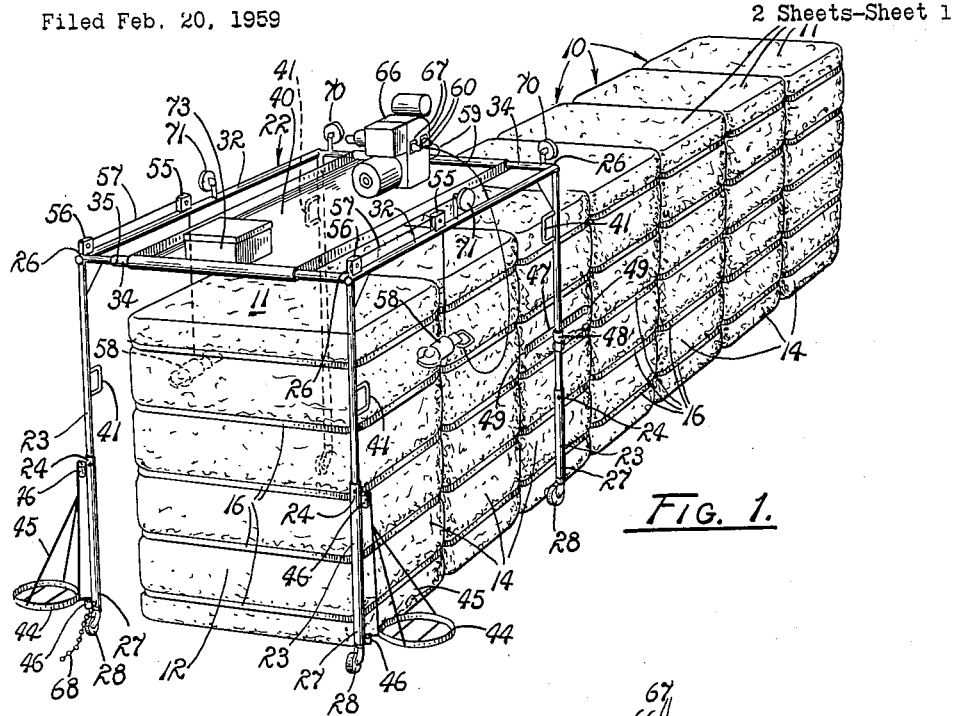
FIG. 1 is a perspective view of a row of bales of cotton and of a bale sampling apparatus, embodying the principles of the present invention, as employed in traversing the row of bales.
Figure 2:
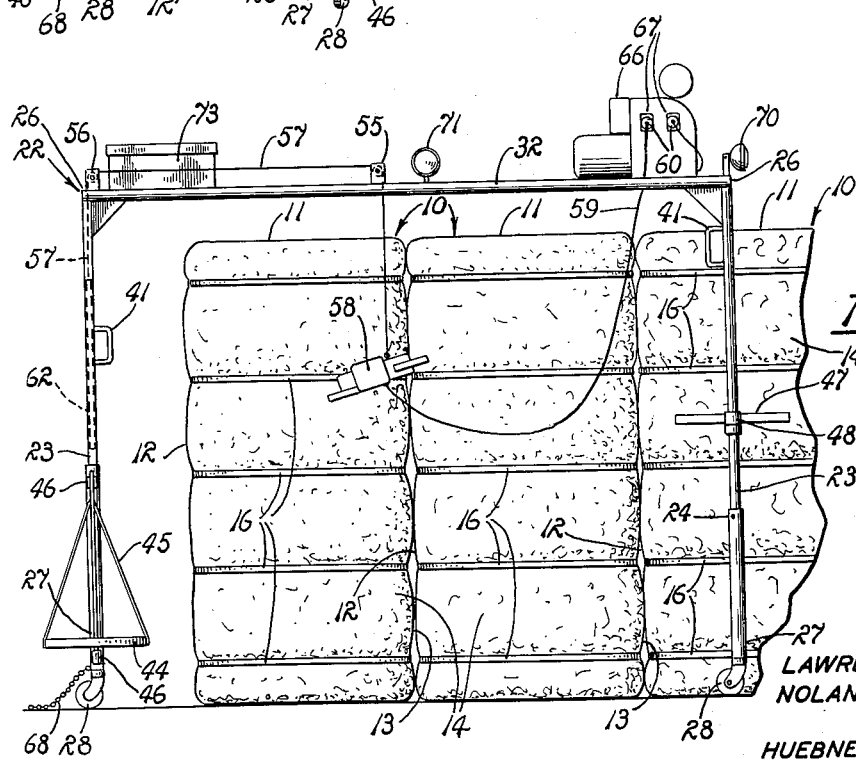
FIG. 2 is a somewhat enlarged, fragmentary side elevation of the row of bales and a full side elevation of the subject bale sampling apparatus.
Figure 3:
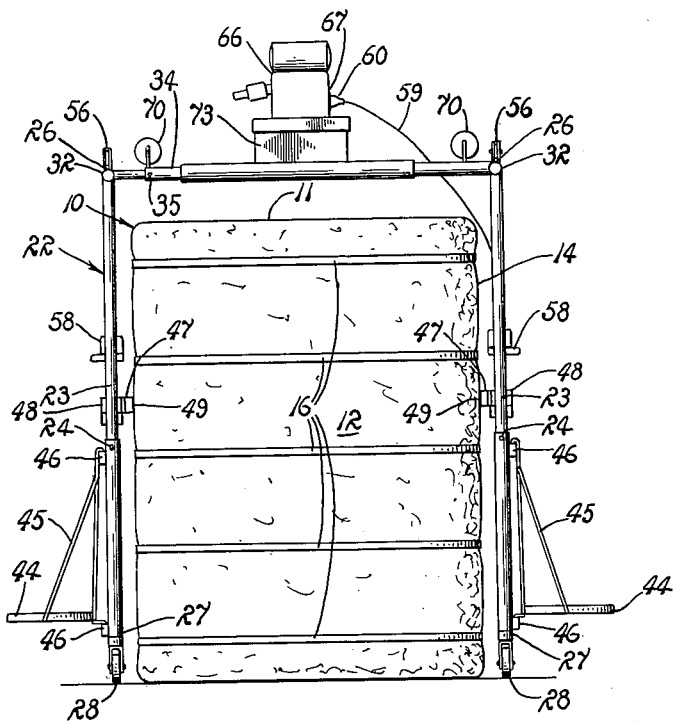
FIG. 3 is an end view of the row of bales and apparatus as illustrated in FIG. 2.

Referring more particularly to the drawings, a row of bales 10 of cotton is illustrated in FIG. 1 as usually arranged in an outdoor yard for storage or marshalling purposes. In a yard there may be many rows of bales with a great many bales in each row. Each bale has upper and lower ends 11, front and back surfaces 12 and 13, respectively, and opposite sides 14. The lower ends of the bales are rested on the ground and adjacent front and back surfaces of adjacent bales are in contact, or nearly so. Thus, the sides of the bales are disposed outwardly and are in substantially common vertical planes along opposite sides of the row. Obviously, with bales of substantially uniform size, the upper ends of the bales are also in a substantially common horizontal plane. Bands 16 individually encircle the bales against the front and back surfaces and the opposite sides and in longitudinally spaced relation along each bale to hold the same in compressed condition. The precise orientation of the bales, as described, is not essential to the present invention, as will be evident hereafter, but is set forth inasmuch as it is the usual way in which the bales are arranged and conveniently illustrates use of the invention. It is of convenience that the opposite sides of the bales be in substantially common planes, and that the upper ends be similarly coplanar so that the row has a substantially uniform width and height. Although reference is made throughout to bales of cotton, it is to be understood that the subject invention is equally as adaptable for sampling bales of other compressed bulk material or the like.

The apparatus of the subject invention includes an inverted U-shaped, elongated frame 22 adapted to straddle the row of bales 10. The frame includes transversely spaced, front and rear pairs of upright tubular, telescopically adjustable legs 23. Each leg includes relatively slidable upper and lower portions for enabling elevational adjustment of the frame. Set screws 24 are extended through the outer lower portions of the legs for engagement with their respectively associated inner upper portions thereby to hold the legs in selected positions of telescopic adjustment.

The legs have open upper ends 26 and lower ends 27. Caster wheels 28, preferably of hard rubber, are swivelly mounted on the lower ends of the legs to provide multi-directional ground support.

The frame 22 also includes upper elongated, longitudinal side bars 32 rigidly interconnecting the upper ends 26 of the legs 23 on opposite sides of the frame. The longitudinal bars are in a substantially common plane when the legs are elevationally adjusted to the same length. Further, telescopically adjustable, upper elongated transverse bars 34 interconnect the front and rear pairs of legs at the upper ends thereof and adjacent to the connections of the longitudinal bars to the legs. The legs, longitudinal bars, and transverse bars, at the upper corners of the frame, are therefore in substantially right angular relation. Set screws 35 are provided on the transverse bars for securing the same in selected positions of telescopic adjustment. When the transverse bars are of equal length, the longitudinal bars are held in spaced substantially parallel relation to each other.

The frame 22 further provides an elongated substantially rectangular platform 40 having front and rear portions rigidly interconnecting corresponding outer telescopic portions of the transverse bars 34. The platform has opposite side edges which are preferably spaced from their respectively adjacent side bars 32. Handles 41 are rigidly connected to the legs 23. Upper and lower sockets 42 are also secured, as by welding, to the rear legs, and sample supporting trays 44 provide brackets 45 pivotally received in the sockets. Elongated resiliently flexible arcuate guides 47 include collars 48 elevationally slidably, adjustably fitted on the front pair of legs 23. The guides have inwardly disposed, convex, bale engaging surfaces 49.

Forward and rearward pulleys 55 and 56 are mounted on the side bars 32 respectively substantially equidistantly between the forward and rearward pairs of legs 23 and adjacent to the open upper ends 26 of the rear legs. These pulleys are rotatable about horizontal axes disposed transversely of the frame 22 and pulleys on the same side of the frame are coplanar. Elongated flexible cables 57 are trained over associated pulleys at opposite sides of the frame and have ends hanging respectively downwardly through the upper open ends of and within the rear legs from the rearward pulleys and centrally of the side bars from the forward pulleys. Portable, electrical, hand-operated circular saws 58 are individually connected to the ends of the cables depending from the forward pulleys. Each saw includes an electrical power cord 59 having a plug 60 thereon. Elongated preferably cylindrical weights 62 are individually positioned within the rear legs 23 and are connected to the respectively adjacent ends of the cables which hang downwardly from the rearward pulleys 56. These weights are individually substantially equal in weight to the saws connected to the opposite ends of their respective cables. Therefore, the weights counterbalance the saws so that the saws tend to remain in whatever elevationally adjusted position they are placed. This counterbalancing system is constructed so that the saws can be elevationally adjusted substantially the full height of the frame 22, that is throughout the full length of the legs 23.

An electric power plant 66 is mounted on the platform 40, preferably adjacent to the forward end thereof. This power plant may include a gasoline engine, or any other means for driving an electrical generator which produces a desired voltage. The power plant has a plurality of outlet receptacles 67 adapted to receive the plugs 60 in electrically connected relation. An electrically conductive grounding chain 68 is connected to one of the legs 23 and contacts the ground adjacent to the frame 22.

Headlights 70 are preferably swively mounted on the frame 22 at the forward corners thereof, that is, at the intersections of the front legs 23, the front transverse bar 34, and the side bars 32. Also, side lights 71 are preferably swively mounted on the side bars 32 forwardly adjacent to the forward pulleys 55. Although not shown, power cords are provided with these lights for electrical connection to the power plant 66 when it is desired to energize the lights. A tool box 73 is also preferably mounted on the platform 40 adjacent to the rearward end thereof. This box is adapted to contain other tools which may be useful in the marshalling yard in which the bales 10 of cotton are located. Further, this box is employed to store the saws 58 when not in use.

*Operation*

The operation of the described embodiment of the subject invention is believed to be readily apparent and is briefly summarized at this point. It is to be assumed that the bales 10 of cotton are arranged in rows, as described.

When it is desired to sample the cotton in the bales 10, the frame 22 is adjusted in height and width so that the transverse distance between the legs 23 is slightly greater than the width of the row of bales and the height of the platform 40 is adjusted so as to be slightly greater than the height of the bales. The frame is then moved into straddling relation with the row of bales so that the frame extends longitudinally of the row with the legs on opposite sides of the frame being adjacent to opposite sides 14 of the bales. When properly positioned, the guides 47 resiliently flexibly engage the opposite sides of the bales and maintain the frame in desired transversely spaced relation with respect to the bales. Normally, sample baskets, not shown, are supported in the trays 44. With the circular saws 58 plugged into the power plant 66, workmen at opposite sides of the frame 22 operate the saws to remove samples from opposite sides of the bales 10.

Figure 4:
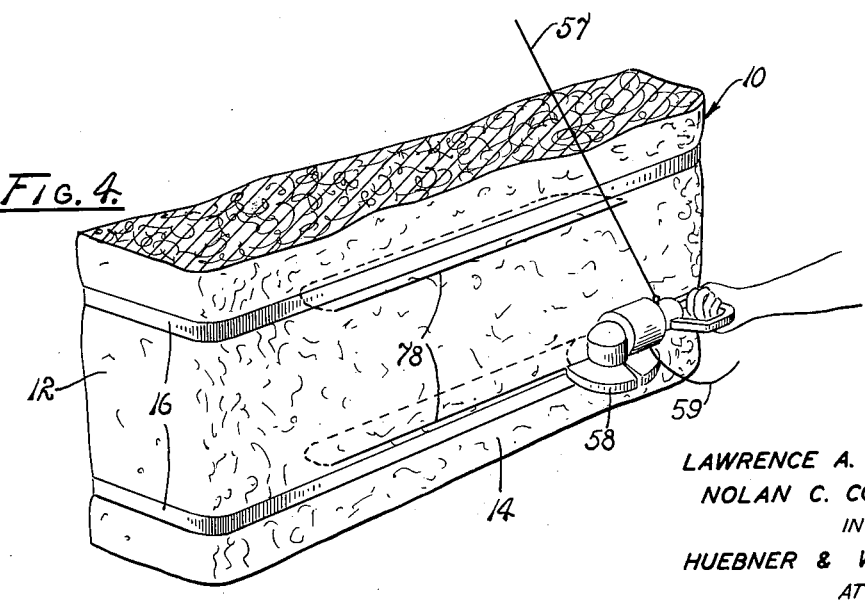
FIG. 4 is a somewhat enlarged fragmentary perspective view of one of the bales of cotton and showing a portable electrical circular saw employed for cutting a sample from the bale.

The saws 58 are moved elevationally relative to the sides 14 of a bale 10 so that it is first positioned adjacent to a pair of bale bands 16 disposed centrally of the bale. With the saw blade in cutting position, the saw is moved longitudinally subjacent to an upper one of the central bands, as specifically shown in FIG. 4. Thereafter, a similar cut is made upwardly adjacent to the band next therebelow. Normally, the length of the cuts 78 are approximately fourteen to eighteen inches while the distance between the cuts is approximately ten inches. When these cuts have been made, the portion of the bale between the cuts is manually removed and placed in a basket, not shown, on one of the trays 44.

After samples have been removed from opposite sides 14 of a bale 10, the frame 22 is moved longitudinally of the row so that the saws 58 are opposite to the sides of a successive bale or pair of bales in the row. Samples are removed as before. The same procedure is followed throughout the length of the row until each bale has been sampled.

It has been found that bales 10 can be sampled in a very rapid and efficient manner by use of the subject apparatus. Further, the sampling operation can be continued into the night, if desired, by utilizing the lights 70 and 71. The subject apparatus makes practical the use of portable, electric, circular saws for sampling and by enabling such use, relatively unskilled labor can be employed. It is found that cuts can be made more efficiently into the bales with these saws thereby resulting in a minimum of waste. The mobile unit described is integrated in the sense that it provides a source of power as well as work tools for sampling and other processing of the baled material in outdoor or indoor areas where permanently installed electrical energy is not available.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices and apparatus.

Having described our invention, what we claim as new and desire to secure by Letters Patent is:

1. An apparatus for use in removing samples from bales of material arranged in side-by-side relation in a row comprising a frame, means mounting the frame for earth traversing movement longitudinally of and adjacent to such a row of bales, an independent electrical power source mounted on the frame, a portable, hand-operated saw adapted to cut a sample from such bales, counterbalancing means connected to the saw and mounted in the frame for supporting the saw for longitudinal movement relative to the frame in selected, elevationally adjustable, sampling positions adjacent to a bale to be sampled while the frame is in juxtaposition to such bale, and conducting means interconnecting the saw and the power source for energizing the saw.

2. A mobile apparatus, for use in taking samples from bales of compressed material arranged in side-by-side relation in a row wherein the bales in such row are of substantially uniform width and height, comprising an elongated, inverted U-shaped frame adapted to straddle such a row of bales and having opposite ends, the frame having transversely spaced side portions adjacent to opposite sides of the bales in the row when the frame straddles the row and a top portion interconnecting the side portions in upwardly spaced relation to such bales when the frame straddles the row, ground engaging means connected to the side portions of the frame and mounting the frame for earth traversing movement longitudinally of the row of bales, a portable electrical circular saw adapted to cut a sample of the material from such bales, an electrical power plant mounted on the top portion of the frame, means electrically interconnecting the power plant and the circular saw for enabling energization of the saw, a weighted counterbalancing system mounted on the frame and supporting the saw at one side of the frame intermediate the opposite ends thereof and in dependent, elevationally adjustable, position adjacent to the sides of the bales as the frame is moved longitudinally of such row whereby the saw is in a position to cut a sample from a bale when the frame positions the saw in juxtaposed relation to such a bale, and resilient bale engaging means connected to the opposite side portions of the frame and adapted for slidable engagement with the bales during traversal of the frame along the row to maintain the frame in predetermined position transversely of the row.

3. The apparatus of claim 2 wherein the side portions include longitudinally spaced, upstanding legs and longitudinal bars rigidly interconnecting the legs on opposite side portions of the frame, and wherein the top portion of the frame includes transverse bars interconnecting corresponding transversely spaced legs where the longitudinal bars connect to the legs and a substantially horizontal platform rigidly interconnecting and supported by the transverse bars, the power plant being borne by the platform.

4. The apparatus of claim 3 wherein the legs and the transverse bars are telescopically adjustable for varying the height and the width, respectively, of the frame.

5. The apparatus of claim 3 wherein one of the legs is hollow and has an open upper end, wherein the counterbalancing system includes a series of pulleys, one of the pulleys being rotatably mounted on the longitudinal bar connected to the leg having an open upper end and substantially equidistantly between the legs connected to such bar, another of the pulleys in said series being rotatably connected to said bar adjacent to the open upper end of said leg, an elongated flexible cable trained over the pulleys having an end extended downwardly into the hollow leg through its open upper end and an opposite end hanging downwardly from said longitudinal bar and connected to the saw, and an elongated weight substantially equal to the weight of the saw connected to the first end of the cable and located within the hollow leg for elevational movement therein whereby the saw is elevationally adjustably supported from said bar.

6. The apparatus of claim 3 wherein said bale engaging means is a pair of substantially horizontally extended, arcuate guides individually elevationally adjustably mounted on legs of opposite side portions of the frame, the straps having inwardly disposed, smooth convex surfaces adapted for slidable engagement with opposite sides of the bales in such a row.

7. A bale sampling apparatus comprising a frame, ground engaging means connected to the frame mounting the frame for earth traversing movement, powered sample cutting means, flexible tension means interconnecting the cutting means and the frame supporting the cutting means in the frame for universal movement relative thereto, an independent source of power mounted in the frame for integral earth traversing movement with the frame, and a flexible power linkage interconnecting the source of power and the cutting means in driving-driven relation.

8. A bale sampling apparatus comprising a frame, ground engaging means connected to the frame mounting the frame for earth traversing movement, an electrically powered sample cutting means, a counterbalanced flexible member supporting the cutting means for adjustable elevational movement in the frame and swinging horizontal movement, an independent source of electrical power mounted in the frame for integral earth traversing movement with the frame, and a flexible conductor interconnecting the cutting means and the source of electrical power.

9. A bale sampling apparatus comprising a frame, ground engaging means connected to the frame mounting the frame for earth traversing movement, a portable electrical saw, an electrical power plant mounted on the frame, a flexible conductor interconnecting the power plant and saw for energizing the saw, and a counterbalancing system mounted on the frame supporting the saw in depending elevationally adjustable position remote from the frame and for swinging movement.

10. A bale sampling apparatus comprising a frame, ground engaging means connected to the frame mounting the frame for earth traversing movement in a path longitudinally of the row of bales, a portable electrical saw adapted to cut a sample of the material from such bales, an electrical power plant mounted on the frame, a flexible conductor interconnecting the saw and the power plant, a weighted counterbalancing system mounted on the frame and supporting the saw at a side thereof in depending, elevationally adjustable position and for swinging movement longitudinally and transversely of the path of movement of the frame, and resilient bale engaging means connected to the frame and disposed for slidable engagement with the bales during travel of the frame along the row to maintain the frame in predetermined transversely spaced relation to the row.

References Cited in the file of this patent

UNITED STATES PATENTS

| | | |
|---|---|---|
| 2,216,989 | St. Clair | Oct. 8, 1940 |
| 2,355,208 | Devol et al. | Aug. 8, 1944 |
| 2,459,383 | Levy | Jan. 18, 1949 |
| 2,689,718 | Headlee et al. | Sept. 21, 1954 |